(12) United States Patent
Cao et al.

(10) Patent No.: US 12,725,175 B2
(45) Date of Patent: Sep. 1, 2026

(54) IDENTIFICATION OF COUNTERFEIT COLLECTIBLE CARDS

(71) Applicant: Collectors Universe, Inc., Santa Ana, CA (US)

(72) Inventors: Hu Cao, Cypress, CA (US); Kassim Lovett, Falls Church, VA (US); Danylo Prykhodko, Naples, FL (US); Pushkar Kumar Jain, Dallas, TX (US); Bradley Sliz, Libertyville, IL (US); David Shalamberidze, Naples, FL (US); Pratixa Joshi, Fremont, CA (US)

(73) Assignee: Collectors Universe, Inc., Santa Ana, CA (US)

( * ) Notice: Subject to any disclaimer, the term of this patent is extended or adjusted under 35 U.S.C. 154(b) by 0 days.

(21) Appl. No.: 19/065,694

(22) Filed: Feb. 27, 2025

(65) Prior Publication Data

US 2025/0278745 A1 Sep. 4, 2025

Related U.S. Application Data

(60) Provisional application No. 63/559,319, filed on Feb. 29, 2024.

(51) Int. Cl.
*G06Q 30/018* (2023.01)
*G06V 10/25* (2022.01)
(Continued)

(52) U.S. Cl.
CPC ......... *G06Q 30/0185* (2013.01); *G06V 10/25* (2022.01); *G06V 10/761* (2022.01); *G06V 10/82* (2022.01); *G06V 30/418* (2022.01)

(58) Field of Classification Search
CPC .................................................. G06Q 30/0185
See application file for complete search history.

(56) References Cited

U.S. PATENT DOCUMENTS

2006/0004914 A1* 1/2006 Kelly ..................... G06Q 30/00 709/219
2018/0246894 A1 8/2018 Kass et al.
(Continued)

FOREIGN PATENT DOCUMENTS

CN 108596312 A * 9/2018 ....... G06K 19/06037
CN 111523910 A * 8/2020 ............. G06F 18/22
CN 114943720 A * 8/2022 ........... G06V 10/462

OTHER PUBLICATIONS

Dobbs, Todds. Art Authentication in an Untagged Art Database. Diss. The University of North Carolina at Charlotte, 2022. (Year: 2022).*

*Primary Examiner* — Emmett K. Walsh
(74) *Attorney, Agent, or Firm* — Alumen IP Law PC

(57) ABSTRACT

A counterfeit detection system includes one or more computer devices for determining if a collectible card is counterfeit. The counterfeit detection system includes executable code that, when executed, enables the computer system to perform a process. The process includes the steps of: providing a database of reference card images; receiving an image of the collectible card; selecting at least one region of the image of the collectible card; determining a selected reference card image from the database of reference card images, which corresponds with the image of the collectible card; comparing, via a neural network, the at least one region of the image to a corresponding region of the selected reference card; and determining whether the collectible card is authentic or counterfeit based upon similarities and differences between the image of the collectible card and the reference card image, in the at least one region.

25 Claims, 3 Drawing Sheets

(51) Int. Cl.

| | |
|---|---|
| ***G06V 10/74*** | (2022.01) |
| ***G06V 10/82*** | (2022.01) |
| ***G06V 30/418*** | (2022.01) |

(56) References Cited

U.S. PATENT DOCUMENTS

2018/0246895 A1 8/2018 Kass et al.
2024/0412233 A1 * 12/2024 Yan ...................... G06V 10/764
2025/0061470 A1 * 2/2025 Chen .................. G06Q 30/0185

* cited by examiner

IDENTIFICATION OF COUNTERFEIT COLLECTIBLE CARDS

CROSS-REFERENCE TO RELATED APPLICATIONS

This application for a utility patent claims the benefit of U.S. Provisional Application No. 63/559,319, filed Feb. 29, 2024.

BACKGROUND

Collectible cards, such as for sports figures and other forms of collectible cards, have long been collected by young and old alike. Some may collect the cards for enjoyment. Others may collect the cards in the hope of profit. In either case, generally it is desired that the collected cards be the authentic card properly issued by the card producer, and not a counterfeit card.

Unfortunately, determining that a card is counterfeit may be difficult, particularly for those that have not gained expertise in the field, which possibly may require many hours and years of experience and study. Counterfeit detection may also be expensive, interfering with the enjoyment and profits of collectors. There is therefore a long felt need in the industry for a system and method that can quickly and inexpensively detect counterfeit collectible cards.

BRIEF SUMMARY OF THE INVENTION

Some aspects provide a neural network trained to determine if a collectible card is a counterfeit based on information of a plurality of regions of an image of a collectible card. In some embodiments the information of at least one of the regions of the image is amplified information of the regions. In some embodiments the amplified information comprises repeats of the information of the regions. In some embodiments, for at least one region, the neural network is provided information of the at least one region in the form of image information which repeats information of the at least one region. In some embodiments the neural network is configured to receive information of a fixed size for a region, with the fixed size greater than a size of the region, and with information of the region repeated so as to fill the fixed size. In some embodiments the plurality of regions comprises at least three regions.

In some embodiments, the regions are predetermined regions. In some embodiments regions of the image of the collectible card that are not the predetermined regions are ignored. In some embodiments the image of the collectible card is received over a network. In some embodiments the image of the collectible card received over the network is generated by an image capture device of a computer device. In some embodiments the computer device is a smartphone. In some embodiments the neural network includes at least two identical sub-networks. In some embodiments at least one of the sub-networks operates using data representative of information of regions of the image of the collectible card, and at least one other of the sub-networks operates using data representative of information of regions of an image of an authentic collectible card that has a same specification as the collectible card. In some embodiments the image of the collectible card and the authentic collectible card are aligned.

In some embodiments the alignment is performed using at least a scale-invariant feature transform. In some embodiments the authentic collectible card is a randomly chosen representative authentic collectible card. In some embodiments the randomly chosen representative authentic collectible card is selected from a collection of authentic collectible cards. In some embodiments the plurality of regions of the image of the collectible card comprise regions of interest. In some embodiments the regions of interest have been manually identified. In some embodiments the collectible card is determined to be a valid collectible card if a distance between the collectible card and the randomly chosen representative authentic collectible card is within a predetermined distance. In some embodiments the distance between the collectible card and the randomly chosen representative authentic collectible card is based on vectors output by the neural network. In some embodiments the distance between the collectible card and the randomly chosen representative authentic collectible card is determined by the neural network.

In some aspects the neural network is trained to determine if a collectible card is a counterfeit using information of a plurality of regions of interest of images of a plurality of pairs of counterfeit collectible cards and authentic collectible cards. In some embodiments the plurality of regions is at least three regions. In some embodiments the information of the regions of interest is determined using at least a scale-invariant feature transform.

In some aspects a collectible card is determined to be either authentic or counterfeit. In some embodiments the collectible card is determined to be either authentic or counterfeit based on outputs of a neural network. In some embodiments the neural network includes at least two identical sub-networks, with information of matching regions of interest of the collectible card and a randomly chosen representative authentic collectible card each provided to different ones of the at least two identical sub-networks. In some embodiments the matching regions of interest include at least three regions.

These and other aspects of the invention are more fully comprehended upon review of this disclosure.

DETAILED DESCRIPTION

Figure 1:
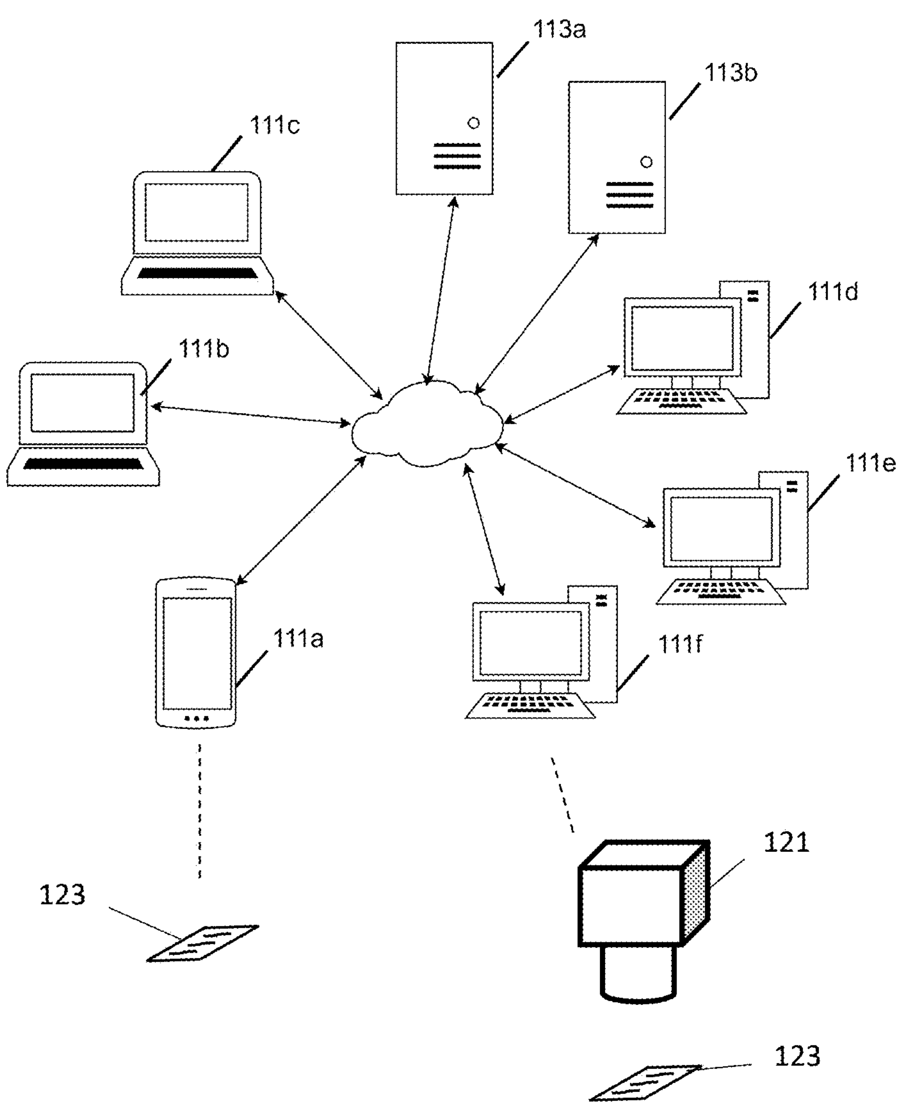
FIG. 1 is a semi-block diagram of a system including components to determine if a collectible card is authentic or counterfeit, in accordance with aspects of the invention.

FIG. 1 is a semi-block diagram of a system including components to determine if a collectible card is authentic or counterfeit. The system includes a plurality of user compute devices. The user compute device may include, for example, smartphones, for example, smartphone 111*a*, laptop computers, for example laptop computers 111*b,c*, and desktop computers, for example desktop computers 111*d-f*. In various embodiments the user compute device may include tablets and/or other computer devices used by users. The user compute devices generally include at least one processor, memory for storing data and program instructions, and network interface capabilities. Some of the user compute devices may include imaging devices, for example for obtaining images of collectible cards, for example collectible card 123. Some of the user compute devices (or a server) may be coupled to an imaging device, for example imaging device 121, for obtaining images of collectible cards. The user compute devices generally either include a display and user input devices, or, as for example with desktop computers, have associated display and user input devices communicatively coupled to them.

The user compute devices are coupled by a network. The network may be defined by devices connected through a wired connection or include, for example, the Internet. Also coupled to the network are servers, for example servers 113*a,b*. Although only two servers are illustrated in FIG. 1, the user compute devices may be coupled by the network to a large number of servers. In FIG. 1, a first server 113*a* of the servers may be a server providing for execution of operations of a neural network, for example a neural network including at least two identical sub-networks. Also in FIG. 1, a second server 113*b* of the servers may provide for training of the neural network of the first server. Alternatively, one single server can include a combination of at least two identical sub-networks and training of neural networks. In another arrangement, there may be a plurality of servers performing each task.

In some embodiments the neural network is trained to determine if a collectible card is a counterfeit based on information of a plurality of regions of an image of a collectible card. In some embodiments, the neural network is configured to operate using an amplified version of the information of at least some of the regions. In some embodiments the amplification comprises repeating information of the at least some of the regions. In some embodiments the neural network is configured to operate using information of a fixed size, with the fixed size being greater than or equal to a size of information of at least one region. In some embodiments the fixed size is greater than the size of information of each region. In some embodiments information of a region provided to the neural network is repeated so as to fill the fixed size. In some embodiments the information may be repeated so as to stack portions of the image comprising the region in a frame of information. It is believed that the repeating or stacking of the information effectively amplifies signals present in the information of the region, improving results obtained by operation of the neural network, with in some embodiments the results being superior to results that may be manually obtained by, for example, those with expertise in determining whether a collectible card is counterfeit. In some embodiments the plurality of regions comprises at least three regions. In some embodiments at least one of the sub-networks operates using data representative of information of regions of the image of the collectible card, and at least one other of the sub-networks operates using data representative of information of regions of an image of authentic collectible card that has a same specification as the collectible card. In some embodiments the image of the collectible card and the authentic collectible card are aligned. In some embodiments the alignment is performed using at least a scale-invariant feature transform.

In some embodiments the neural network is trained to determine if a collectible card is a counterfeit using information of a plurality of regions of interest of images of a plurality of pairs of counterfeit collectible cards and authentic collectible cards. In some embodiments the plurality of regions is at least three regions. In some embodiments the information of the regions of interest is determined using at least a scale-invariant feature transform.

Figure 2:
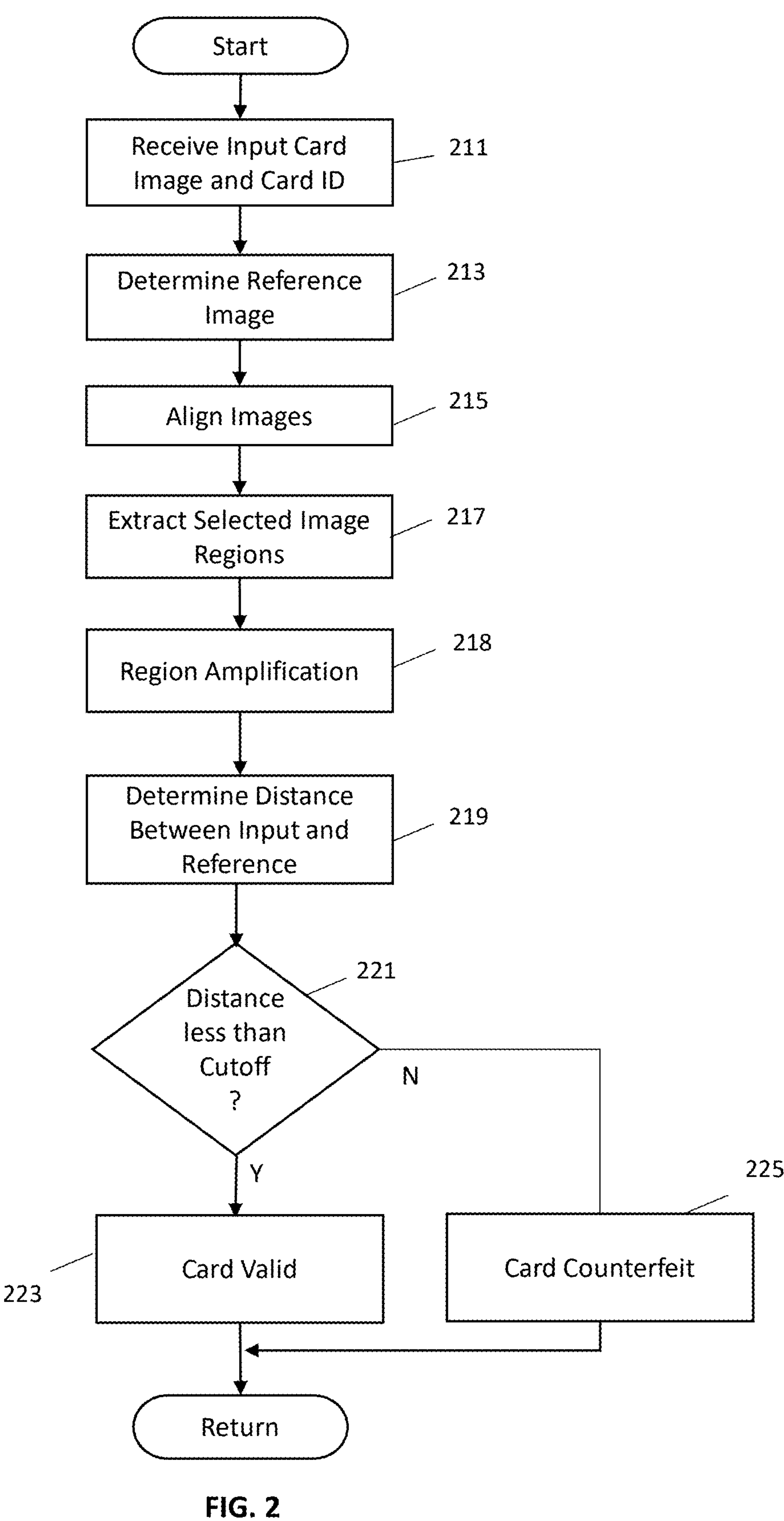
FIG. 2 is a flow diagram of a process for determining if a collectible card is authentic or counterfeit, in accordance with aspects of the invention.

FIG. 2 is a flow diagram of a process for determining if a collectible card is authentic or counterfeit. In some embodiments the process of FIG. 2 is performed by a system, for example the system of FIG. 1. In some embodiments the process of FIG. 2 is performed by one or more servers, for example the server 113*a* of FIG. 1. In some embodiments the process of FIG. 2 is performed by one or more processors.

In block 211 the process receives information of an image of a card to be examined and an identification of the card indicating the specification of the collectible card. The information of the image may be obtained by a first compute device, for example a compute device of FIG. 1, and provided to a server, for example the server 113*b* of FIG. 1. Alternatively, the image can be captured by an imaging system. The identification of the card may be provided as an input to the first compute device or may be obtained by alternate means and provided to the server along with the image, or, in some embodiments, may be determined based on a text description of the card. In some embodiments the identification of the card indicates a specification of the card.

In block 213 the process determines a reference image for use in examining the card. In some embodiments the reference image is determined based on the identification of the card, for example using a table, database, or other data structure correlating identifications of cards and reference images. The reference image may be, for example, in the form of information of an image of a card with the same identification, and which is known to be an authentic, non-counterfeit card. The reference image may be a randomly chosen representative image of the authentic images of the particular collectible card. In some embodiments, for example when no authentic card image is available or when otherwise convenient or efficient, the reference image may be an image of a counterfeit card.

In block 215 the process aligns information of the image of the card and information of the reference image.

In block 217 the process extracts information of a same plurality of regions of the information of the image of the card and information of the reference image. In some embodiments the regions are predetermined corresponding areas of the images. In some embodiments the predetermined corresponding areas are areas known or expected to be useful in determining whether a card is an authentic card or a counterfeit card.

In block 218 the process amplifies information of at least one of the corresponding regions. In some embodiments the process amplifies information of all of the corresponding regions. In some embodiments the amplification of information is achieved by repeating the information for at least one, or all, of the regions. In some embodiments the amplification of information is achieved by copying the information of the region one or more times. In some embodiments the information of the region is provided in a frame, and the frame is copied one or more times. In some embodiments the copies of the frame are placed adjacent to one another in a processing frame for a neural network. In some embodiments the region amplification may not be not performed.

In block 219 the process determines an indication of distance between the card and the reference image. In some embodiments the process determines the indication of distance using a neural network. In some embodiments the neural network has been trained to determine distance between images, or portions of images. In some embodiments the neural network has been trained as discussed with respect to the flow diagram of FIG. 3. In some embodiments the neural network includes at least two identical sub-networks. In some embodiments one of the sub-networks operates using information of the regions of the card, and another of the sub-networks operates using information of the reference image. In some embodiments the distance is a Euclidean distance between ends of vectors generated by the sub-networks. In some embodiments the vectors are normalized vectors. In some embodiments the distance is a cosine distance between directions of the vectors. In some embodiments the distance is indicated by a value between zero and 1. In some embodiments the distance is indicated by a value between −1 and 1. In some embodiments, alternate types of distance metrics may be used.

In block 221 the process determines if the distance is less than a cutoff distance. In some embodiments, for example embodiments with possible distances between zero and 1, distances between authentic cards and reference images will be small, for example 0.2 or less, while distances between counterfeit cards and reference images will be large, for example 0.8 and 1.0. In some embodiments the cutoff distance is in the middle of a range of possible distances. In some embodiments the cutoff distance is determined to best distinguish the authentic cards from the fake cards. The cut off distance may be different for different specifications of cards. The cut off distance may be different for different regions of the same card.

If the distance is less than the cutoff distance, the process proceeds to block 223 and determines that the card is authentic, or at least not counterfeit. If the distance is not less than the cutoff distance, the process proceeds to block 225 and determines that the card is counterfeit.

The process thereafter returns.

Figure 3:
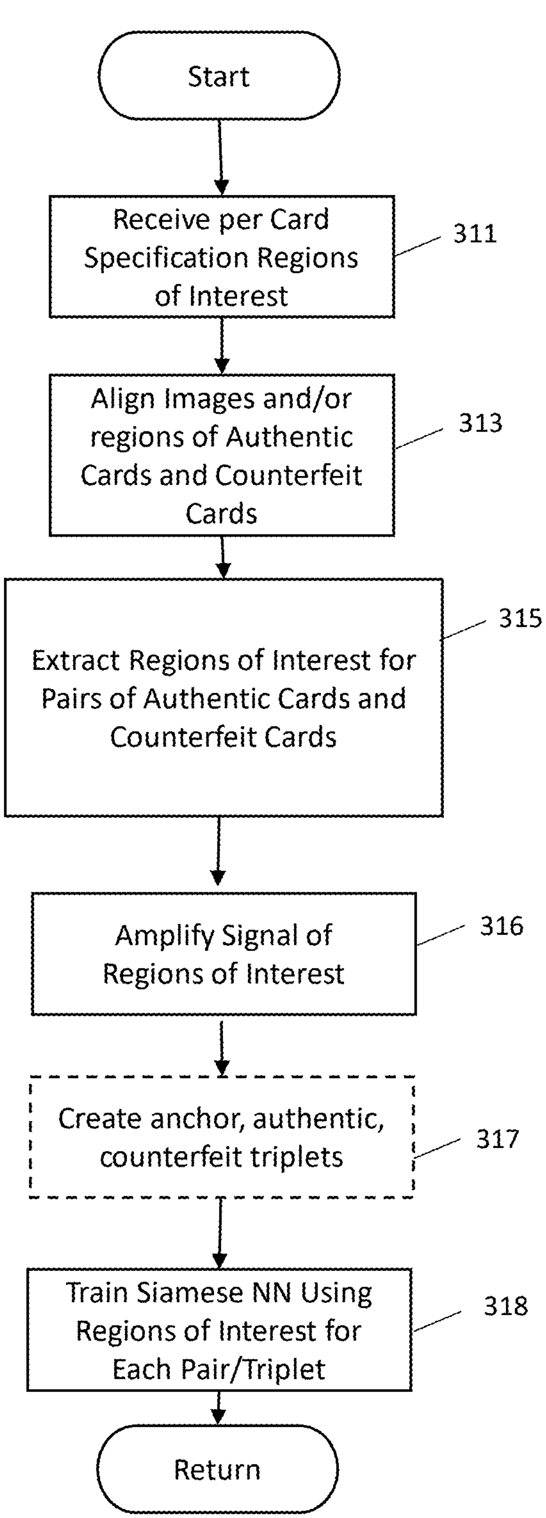
FIG. 3 is a flow diagram of a process for training a neural network to determine if a collectible card is authentic or counterfeit, in accordance with aspects of the invention.

FIG. 3 is a flow diagram of a process for training a neural network to determine if a collectible card is authentic or counterfeit. In some embodiments the process of FIG. 3 is performed by a system, for example the system of FIG. 1. In some embodiments the process of FIG. 3 is performed by one or more servers, for example the server 113*b* of FIG. 1. In some embodiments the process of FIG. 3 is performed by one or more processors. In some embodiments, the process of FIG. 3 is performed completely independent of the system shown in FIG. 1 and the model trained by process in FIG. 3 is saved over a network location or to one or more servers that is available for doing inference on image of collectible card, for example by the process shown in FIG. 2.

In block 311 the process receives identifications of regions of interest for each of a plurality of cards. In some embodiments the regions of interest are identified on or with respect to an anchor image. In some embodiments the anchor image is an image of a card associated with a particular card specification. In some embodiments the anchor image is an image with good image quality (correct focus, good light exposure, and good resolution). In some embodiments the anchor image has been annotated to indicate the regions of interest. In some embodiments the anchor image has regions annotated based on prior knowledge that the regions may be more likely to indicate that a card is counterfeit.

In block 313 the process aligns counterfeit and authentic images of a particular specification of cards or regions of cards. In some embodiments the process may instead align images or regions of images of authentic cards only, for example if no images of counterfeit cards are available.

In block 315 the process extracts information of the regions of interest for those cards.

In block 316 the process amplifies the information of the regions of interest. In some embodiments the information of each region of interest is provided in a frame, and the process copies each frame, in some embodiments multiple times. In some embodiments the process copies the information two times. In some embodiments the process copies the information six times. In some embodiments the process copies the information a sufficient number of times to fill a processing frame for a neural network, or a sub-network of a neural network. In some embodiments the process amplifies the information of the regions of interest for one, some, or all of the authentic card, the counterfeit card, and the anchor image.

In optional block 317 the process creates triplets of the regions of interest of the authentic card, the counterfeit card, and the anchor image. In such embodiments the process may use the triplets in training of a neural network. In some embodiments, however, the neural network may instead use triplet pairs of the regions of interest, for example of the two authentic cards and the counterfeit card, in training of the neural network, and operations of block 317 may not be used. In some embodiments regions of interest of the anchor image and two authentic cards, or the anchor image and one authentic card, in training of the neural network.

In block 318 the process trains a neural network, using the amplified information of the regions of interest, to be able to differentiate between authentic versions of a card and counterfeit versions of the card. In some embodiments the neural network includes a plurality of identical sub-networks. In some embodiments the neural network is a so-called Siamese network. In some embodiments the neural network comprises a single network iteratively executed.

The process thereafter returns.

Although the invention has been discussed with respect to various embodiments, it should be recognized that the invention comprises the novel and non-obvious claims supported by this disclosure.

Example Embodiments

The following are numbered example embodiments of the apparatuses, devices, systems, and methods related to machine learning (ML) and deep learning to detect counterfeit collectible cards. The system utilizes artificial intelligence (AI) to select at least one region of an image of a collectible card to review and determine whether the image of the card, and therefore the collectible card, is a counterfeit. The ML system uses a selected reference card image from a database of reference card images, which corresponds with the image of the collectible card under review. The ML system compares, via a neural network, the at least one region of the image to a corresponding region of the selected reference card and determines whether the collectible card is authentic or counterfeit based upon similarities and differences between the image of the collectible card and the reference card image, in the at least one region. The examples identified below or any other examples disclosed herein may be combined in whole or in part, unless the context indicates otherwise. Elements of the examples disclosed herein, if applicable, are not limiting.

Example 1. A counterfeit detection system for use in determining if a collectible card is counterfeit, the counterfeit detection system comprising: one or more computer devices having a computer processor and computer memory, the computer memory storing executable code that, when executed by the computer processor, enables the computer system to perform a process that comprises the steps of: providing a database of reference card images; receiving an image of the collectible card; selecting at least one region of the image of the collectible card; determining a selected reference card image from the database of reference card images, which corresponds with the image of the collectible card; comparing, via a neural network, the at least one region of the image to a corresponding region of the selected reference card; and determining whether the collectible card is authentic or counterfeit based upon similarities and differences between the image of the collectible card and the reference card image, in the at least one region.

Example 2. The assembly, system, device, apparatus, and method of any of the above Examples alone or in combination, wherein the at least one region comprises a plurality of regions of the image of the collectible card.

Example 3. The assembly, system, device, apparatus, and method of any of the above Examples alone or in combination, wherein the plurality of regions comprises at least three regions.

Example 4. The assembly, system, device, apparatus, and method of any of the above Examples alone or in combination, further comprising a processor configured to amplify information of at least one of the regions of interest.

Example 5. The assembly, system, device, apparatus, and method of any of the above Examples alone or in combination, wherein the neural network is a Siamese neural network.

Example 6. The assembly, system, device, apparatus, and method of any of the above Examples alone or in combination, wherein the Siamese neural network includes two identical sub-networks.

Example 7. The assembly, system, device, apparatus, and method of any of the above Examples alone or in combination, wherein at least one of the sub-networks is configured to operate using data representative of information of regions of the image of the collectible card, and at least one other of the sub-networks is configured to operate using data representative of information of regions of an image of the authentic collectible card that has a same specification as the collectible card Example 8. The assembly, system, device, apparatus, and method of any of the above Examples alone or in combination, wherein the image of the collectible card and the authentic collectible card are aligned.

Example 9. The assembly, system, device, apparatus, and method of any of the above Examples alone or in combination, wherein the alignment is by operation of at least a scale-invariant feature transform.

Example 10. The assembly, system, device, apparatus, and method of any of the above Examples alone or in combination, wherein the plurality of regions of the image of the collectible card comprise regions of interest.

Example 11. The assembly, system, device, apparatus, and method of any of the above Examples alone or in combination, wherein the plurality of regions of the image of the collectible card comprise two spaced apart regions of the image, within the outer perimeter of the card.

Example 12. The assembly, system, device, apparatus, and method of any of the above Examples alone or in combination, wherein at least one region of the image of the collectible card comprises at least one of an alpha character and a numeric character.

Example 13. The assembly, system, device, apparatus, and method of any of the above Examples alone or in combination, wherein at least one region of the image of the collectible card comprises both an alpha character and a numeric character.

Example 14. The assembly, system, device, apparatus, and method of any of the above Examples alone or in combination, wherein the regions of interest have been manually identified.

Example 15. The assembly, system, device, apparatus, and method of any of the above Examples alone or in combination, wherein the neural network receives instructions to review the manually identified regions of interest to determine whether the collectible card is authentic or counterfeit.

Example 16. The assembly, system, device, apparatus, and method of any of the above Examples alone or in combination, wherein the neural network is configured to determine that the collectible card is a valid collectible card if an indication of distance between two points of the region under review of the collectible card and the corresponding distance of the authentic collectible card used for comparing is within a predetermined distance.

Example 17. The assembly, system, device, apparatus, and method of any of the above Examples alone or in combination, wherein the distance between the collectible card and the authentic collectible card is based on vectors output by the neural network.

Example 18. A method for use in determining if a collectible card is counterfeit, the method comprising the steps of: providing a counterfeit detection system for use in determining if a collectible card is counterfeit; providing a database of reference card images; receiving an image of the collectible card; selecting at least one region of the image of the collectible card; determining a selected reference card image from the database of reference card images, which corresponds with the image of the collectible card; comparing, via a neural network, the at least one region of the image to a corresponding region of the selected reference card; and determining whether the collectible card is authentic or counterfeit based upon similarities and differences between the image of the collectible card and the reference card image, in the at least one region.

Example 19. The assembly, system, device, apparatus, and method of any of the above Examples alone or in combination, wherein the differences are based on a distance between two points on the image of the collectible card and the correspondence distance on the reference card.

Example 20. The assembly, system, device, apparatus, and method of any of the above Examples alone or in combination, wherein the distance is scaled at least two times.

Example 21. The assembly, system, device, apparatus, and method of any of the above Examples alone or in combination, wherein the at least one region comprises a plurality of regions of the image of the collectible card.

Example 22. The assembly, system, device, apparatus, and method of any of the above Examples alone or in combination, wherein the plurality of regions comprises at least three regions.

Example 23. The assembly, system, device, apparatus, and method of any of the above Examples alone or in combination, further comprising the step of amplifying information of at least one of the regions of interest, wherein the alignment is by operation of a scale-invariant feature transform.

Example 24. The assembly, system, device, apparatus, and method of any of the above Examples alone or in combination, wherein the neural network is a Siamese neural network that includes two identical sub-networks.

Example 25. The assembly, system, device, apparatus, and method of any of the above Examples alone or in combination, wherein at least one of the sub-networks is configured to operate using data representative of information of regions of the image of the collectible card, and at least one other of the sub-networks is configured to operate using data representative of information of regions of an image of the authentic collectible card that has a same specification as the collectible card.

Example 26. The assembly, system, device, apparatus, and method of any of the above Examples alone or in combination, further comprising the step of aligning the image of the collectible card and the image of the reference collectible card.

Example 27. The assembly, system, device, apparatus, and method of any of the above Examples alone or in combination, wherein the information of at least one of the regions of the image is amplified information of regions.

Example 28. The assembly, system, device, apparatus, and method of any of the above Examples alone or in combination, wherein the amplified information comprises repeats of the information of the regions.

Example 29. The assembly, system, device, apparatus, and method of any of the above Examples alone or in combination, wherein the neural network is provided information of the at least one region in the form of image information that repeats information of the at least one region.

Example 30. The assembly, system, device, apparatus, and method of any of the above Examples alone or in combination, wherein the neural network is configured to receive information of a fixed size for a region, with the fixed size being greater than a size of the region, and with information of the region repeated so as to fill the fixed size.

Example 31. The assembly, system, device, apparatus, and method of any of the above Examples alone or in combination, wherein the alignment is performed using at least a scale-invariant feature transform.

Example 32. The assembly, system, device, apparatus, and method of any of the above Examples alone or in combination, wherein the plurality of regions of the image of the collectible card comprise regions of interest that have been manually identified.

Example 33. The assembly, system, device, apparatus, and method of any of the above Examples alone or in combination, wherein the collectible card is determined to be a valid collectible card if a distance between the collectible card and a corresponding distance on a randomly chosen representative authentic collectible card in the database is within a predetermined distance.

Example 34. The assembly, system, device, apparatus, and method of any of the above Examples alone or in combination, wherein the distance between the collectible card and the randomly chosen representative authentic collectible card is based on vectors output by the neural network.

Example 35. The assembly, system, device, apparatus, and method of any of the above Examples alone or in combination, wherein the distance between the collectible card and the randomly chosen representative authentic collectible card is determined by the neural network.

Example 36. The assembly, system, device, apparatus, and method of any of the above Examples alone or in combination, wherein the collectible card is determined to be a valid collectible card if a distance between the collectible card and a corresponding distance on a chosen representative authentic collectible card in the database, based on a matching evaluation performed by the neural network, is within a predetermined distance.

Example 37. The assembly, system, device, apparatus, and method of any of the above Examples alone or in combination, wherein the collectible card is determined to be a valid collectible card if a distance between the collectible card and a corresponding distance on a chosen representative authentic collectible card in the database, based on a matching evaluation performed manually, is within a predetermined distance.

Example 38. The assembly, system, device, apparatus, and method of any of the above Examples alone or in combination, wherein the neural network is trained to determine if a collectible card is a counterfeit using information of a plurality of regions of interest of images of a plurality of pairs of counterfeit collectible cards and authentic collectible cards.

Example 39. The assembly, system, device, apparatus, and method of any of the above Examples alone or in combination, wherein the information of the regions of interest is determined using at least a scale-invariant feature transform.

Example 40. The assembly, system, device, apparatus, and method of any of the above Examples alone or in combination, wherein the amplification comprises repeating information of the at least some of the regions.

Example 41. The assembly, system, device, apparatus, and method of any of the above Examples alone or in combination, wherein the neural network is configured to operate using information of a fixed size, with the fixed size being greater than or equal to a size of information of at least one region.

Example 42. The assembly, system, device, apparatus, and method of any of the above Examples alone or in combination, wherein the fixed size is greater than the size of information of each region.

Example 43. The assembly, system, device, apparatus, and method of any of the above Examples alone or in combination, wherein information of a region provided to the neural network is repeated so as to fill the fixed size.

Example 44. The assembly, system, device, apparatus, and method of any of the above Examples alone or in combination, wherein the information is repeated so as to stack portions of the image comprising the region in a frame of information.

Example 45. The assembly, system, device, apparatus, and method of any of the above Examples alone or in combination, wherein the identification of the collectible card to be evaluated for counterfeit is provided as an input to a first computer on the server.

Example 46. The assembly, system, device, apparatus, and method of any of the above Examples alone or in combination, wherein the input includes at least one of an image of the collectible card and a text description of the collectible card.

Example 47. The assembly, system, device, apparatus, and method of any of the above Examples alone or in combination, wherein the identification of the card indicates a specification of the card.

Example 48. The assembly, system, device, apparatus, and method of any of the above Examples alone or in combination, wherein the reference image has the same information and identification as the collectible card to be examined for counterfeit.

Example 49. The assembly, system, device, apparatus, and method of any of the above Examples alone or in combination, wherein information and identification of the reference card are known to be an authentic of a non-counterfeit card.

Example 50. The assembly, system, device, apparatus, and method of any of the above Examples alone or in combination, wherein the reference image is a randomly chosen representative image of the authentic images of the particular collectible card.

Example 51. The assembly, system, device, apparatus, and method of any of the above Examples alone or in combination, wherein the reference image is an image of a known counterfeit card.

Example 52. The assembly, system, device, apparatus, and method of any of the above Examples alone or in combination, wherein the amplification of information is achieved by copying the information of the region one or more times.

Example 53. The assembly, system, device, apparatus, and method of any of the above Examples alone or in combination, wherein the information of the region is provided in a frame, and the frame is copied one or more times.

Example 54. The assembly, system, device, apparatus, and method of any of the above Examples alone or in combination, wherein the copies of the frame are placed adjacent to one another in a processing frame for a neural network.

Example 55. The assembly, system, device, apparatus, and method of any of the above Examples alone or in combination, wherein the indication of distance is determined using a neural network.

Example 56. The assembly, system, device, apparatus, and method of any of the above Examples alone or in combination, wherein the neural network has been trained to determine distance between images, or portions of images.

Example 57. The assembly, system, device, apparatus, and method of any of the above Examples alone or in combination, wherein the distance is a Euclidean distance between ends of vectors generated by the sub-networks.

Example 58. The assembly, system, device, apparatus, and method of any of the above Examples alone or in combination, wherein the vectors are normalized vectors.

Example 59. The assembly, system, device, apparatus, and method of any of the above Examples alone or in combination, wherein the distance is a cosine distance between directions of the vectors.

Example 60. The assembly, system, device, apparatus, and method of any of the above Examples alone or in combination, wherein the distance is indicated by a value between zero and 1.

Example 61. The assembly, system, device, apparatus, and method of any of the above Examples alone or in combination, wherein the distance is indicated by a value between −1 and 1.

Example 62. The assembly, system, device, apparatus, and method of any of the above Examples alone or in combination, wherein the neural network determines if the distance is less than a cutoff distance.

Example 63. The assembly, system, device, apparatus, and method of any of the above Examples alone or in combination, wherein when the distances are between zero and 1, the distance between an image of an authentic card and the reference images is 0.3 or less while the distance between an image of a counterfeit card and the reference images is 0.7 to 1.0.

Example 64. The assembly, system, device, apparatus, and method of any of the above Examples alone or in combination, wherein the cutoff distance is in the middle of a range of possible distances.

Example 65. The assembly, system, device, apparatus, and method of any of the above Examples alone or in combination, wherein the cutoff distance is determined to best distinguish an authentic card from counterfeit cards.

Example 66. The assembly, system, device, apparatus, and method of any of the above Examples alone or in combination, wherein cut off distance is different for different specifications of cards.

Example 67. The assembly, system, device, apparatus, and method of any of the above Examples alone or in combination, wherein the distance is not less than the cutoff distance and the process determines that the collectible card is counterfeit.

Example 68. The assembly, system, device, apparatus, and method of any of the above Examples alone or in combination, wherein an image of a reference card has been annotated to indicate the regions of interest.

Example 69. The assembly, system, device, apparatus, and method of any of the above Examples alone or in combination, wherein the image of the reference card has regions annotated based on prior knowledge that the regions are more likely to indicate that a card is counterfeit.

What is claimed is:

1. A counterfeit detection system for use in determining if a collectible card is counterfeit, the counterfeit detection system comprising:

one or more computer devices having a computer processor and computer memory, the computer memory storing executable code that, when executed by the computer processor, enables the computer system to perform a process that comprises the steps of:

maintaining a database of authenticated reference card images for known collectible card specification;

receiving from a client device, a digital image of a collectible card to be evaluated for counterfeit, the collectible card to be evaluated defining a subject collectible card and having a subject collectible card specification;

manually or automatically selecting at least one region of interest from the digital image of the subject collectible card;

identifying a matching authenticated reference card image from the database based on digital image of the subject collectible card or the subject collectible card specification;

aligning the selected at least one region of interest of the digital image of the subject collectible card with a corresponding at least one region of interest of the reference card image using Scale-Invariant Feature Transform (SIFT);

amplifying pixel data of the digital image of the at least one region of interest of the subject collectible card and of the reference card image;

comparing the aligned and amplified at least one region of interest of the digital image of the subject collectible card and of the reference card image using a neural network architecture that generates feature vectors and computes a distance metric between the feature vectors; and outputting an authenticity determination by classifying the subject collectible card as authentic or counterfeit when the computed distance metric satisfies a predetermined threshold, in the at least one region of interest of the digital image of the subject collectible card.

2. The counterfeit detection system of claim 1, wherein the at least one region of interest comprises a plurality of regions of the image of the subject collectible card.

3. The counterfeit detection system of claim 2, wherein the plurality of regions of interests comprises at least three regions.

4. The counterfeit detection system of claim 1, further comprising a processor configured to amplify the pixel data of the at least one of the regions of interest prior to input into the neural network architecture.

5. The counterfeit detection system of claim 1, wherein the selected at least one region of interest of the digital image of the subject collectible card is aligned with the corresponding at least one region of interest of the authenticated reference card image.

6. The counterfeit detection system of claim 1, wherein the neural network comprises a Siamese neural network architecture that includes two identical sub-networks.

7. The counterfeit detection system of claim 6, wherein one sub-network processes the amplified at least one region of interest of the subject collectible card digital image and the other sub-network processes a corresponding amplified region of interest of the authenticated reference card image to generate feature vectors.

8. The counterfeit detection system of claim 2, wherein the plurality of regions of the image of the subject collectible card are predetermined regions of interest of the subject collectible card.

9. The counterfeit detection system of claim 8, wherein the predetermined regions of interest of the subject collectible card are fixed regions associated with the subject collectible card specification.

10. The counterfeit detection system of claim 4, wherein the neural network is configured to determine that the subject collectible card is a valid authentic card if an indication of distance between the subject collectible card and the reference card image is within a predetermined threshold.

11. The counterfeit detection system of claim 10, wherein the distance between the subject collectible card and the reference card image is based on the distance metric computed between the feature vectors generated by the two sub-networks of the Siamese neural network.

12. The counterfeit detection system of claim 6, wherein the Siamese neural network is trained on a dataset that includes both verified authentic cards and known counterfeit examples, with the training process configured to optimize a distance metric such that the computed distance between matching authentic regions of interest falls below a first threshold and the distance between authentic and counterfeit regions of interest exceeds a second threshold.

13. A method for use in determining if a collectible card is counterfeit, the method comprising the steps of:

maintaining a database of reference card images for known collectible card specifications;

receiving, from a client device, a digital image of a subject collectible card;

selecting a plurality of predetermined regions of interest from the digital image of the subject collectible card;

identifying a matching reference card image from the database based on the collectible card specification;

aligning the selected regions of interest of the subject card image with corresponding regions of interest of the reference card image using Scale-Invariant Feature Transform (SIFT);

amplifying pixel data of the aligned regions of interest;

comparing, via a neural network architecture that includes two identical sub-networks, the amplified regions of interest of the subject collectible card with the amplified regions of interest of the reference card by generating feature vectors and computing a distance metric between them; and determining whether the subject collectible card is authentic or counterfeit by classifying the card based on whether the computed distance metric satisfies a predetermined threshold.

14. The method of claim 13, wherein the selected regions of interest comprises a plurality of regions of the image of the subject collectible card.

15. The method of claim 13, wherein the plurality of regions comprises at least two regions.

16. The method of claim 13, further comprising the step of amplifying the pixel data of the selected regions of interest after alignment using Scale-Invariant Feature Transform (SIFT).

17. The method of claim 13, wherein the neural network comprises a Siamese neural network architecture that includes the two identical sub-networks.

18. The method of claim 13, wherein one sub-network processes the amplified regions of interest from the subject collectible card image and the other sub-network processes the corresponding amplified regions of interest from the reference card image to generate feature vectors for distance comparison.

19. The method of claim 13, determining, via the neural network, whether the subject collectible card is a valid authentic card if an indication of distance between the subject collectible card and the reference card image is within a predetermined threshold.

20. A computer-implemented counterfeit detection system for collectible trading cards, the system comprising: one or more processors and at least one non-transitory computer-readable medium storing executable instructions that, when executed by the one or more processors, cause the system to perform operations comprising:

maintaining a database of authenticated reference card images indexed according to collectible card specifications;

receiving, from a remote client device, a digital image of a subject collectible card;

determining a collectible card specification of the subject collectible card and retrieving a corresponding authenticated reference card image from the database;

selecting a plurality of predetermined regions of interest associated with the determined card specification from the subject collectible card image;

aligning the selected regions of interest of the subject collectible card image with corresponding regions of interest of the authenticated reference card image using Scale-Invariant Feature Transform (SIFT);

amplifying pixel data within each aligned regions of interest by repeating pixel values to produce amplified ROI data;

processing the amplified regions of interest data through a neural network architecture comprising two identical sub-networks to generate a first feature vector from the subject collectible card regions of interest and a second feature vector from the authenticated reference card regions of interest;

computing a distance metric between the first and second feature vectors; and outputting an authenticity determination that classifies the subject collectible card as authentic or counterfeit based on whether the computed distance metric satisfies a predetermined threshold.

21. The system of claim 20, wherein the neural network architecture is a Siamese neutral network architecture.

22. The system of claim 21, wherein the pixel amplification step comprises repeating or duplicating the pixel values of each aligned regions of interest a predetermined number of times to increase the signal strength prior to input into the Siamese neural network.

23. The system of claim 20, wherein the distance metric is a cosine distance and the predetermined threshold is dynamically adjusted based on the specific collectible card specification.

24. The system of claim 21, wherein the two identical sub-networks of the Siamese neural network are convolutional neural networks that share identical weights.

25. The system of claim 21, wherein the Siamese neural network is trained on a dataset that includes both verified authentic cards and known counterfeit examples.

* * * * *